Jan. 23, 1945.    W. W. SHAW    2,367,825
WHEEL CONSTRUCTION
Filed Oct. 21, 1941
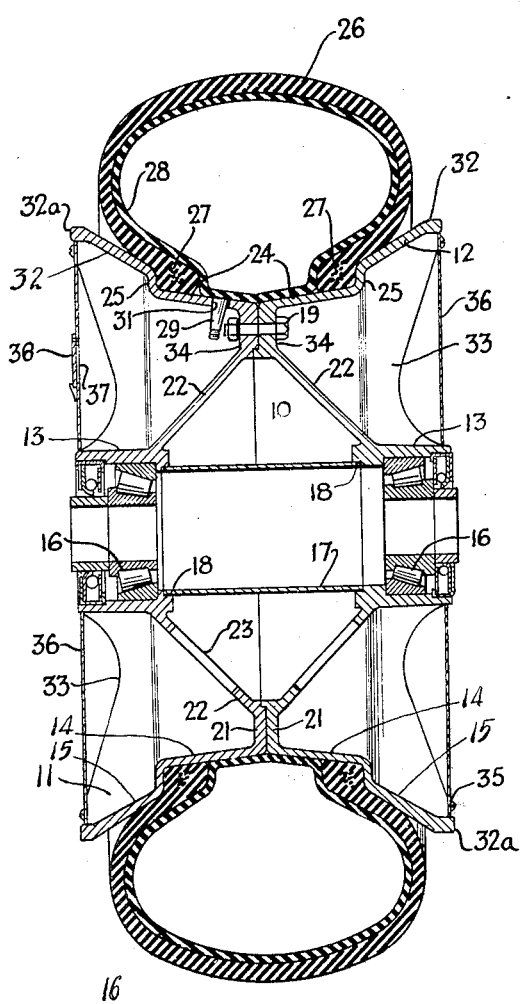
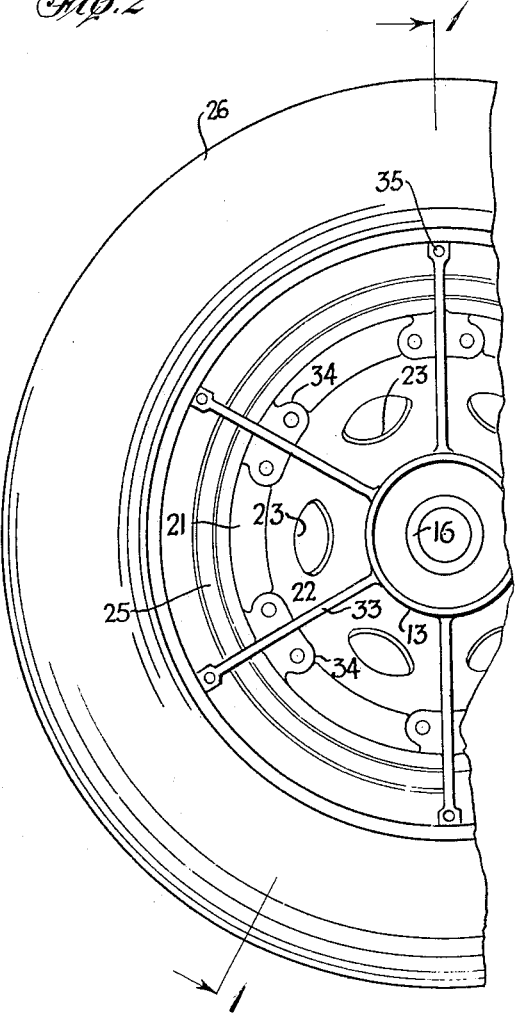
Inventor
Warren W. Shaw
Ely & Frye
Attorneys Patented Jan. 23, 1945

2,367,825

UNITED STATES PATENT OFFICE 2,367,825

WHEEL CONSTRUCTION

Warren W. Shaw, Akron, Ohio, assignor to The Firestone Tire & Rubber Company, Akron, Ohio, a corporation of Ohio Application October 21, 1941, Serial No. 415,901

3 Claims. (Cl. 301—63)

This invention relates to wheel constructions, especially to split wheels adapted to be used on airplanes for supporting the airplane on pneumatic tires.

It is well known that pneumatic airplane tires and tubes are subjected to severe stresses and impacts, especially, when the plane on which the tires are mounted lands. Obviously, such heavy loads and strains on the tires may cause same to fail on some occasions and such tire failure is a serious problem in airplanes because tire failure upon landing may cause the airplane to nose over or be damaged in some other way. In some cases, the entire tire has been thrown from the airplane wheel, when the pneumatic tire or tube fails, and due to the fact that very small diameter wheels are usually used on airplanes, the loss of one tire throws the airplane greatly out of balance and, in general, makes an airplane quite hard to control.

The general object of the present invention is to provide an improved type airplane wheel construction which is adapted to retain a pneumatic tire thereon even though operated when the tire is deflated.

A further object of the invention is to provide a wheel construction which is adapted to reinforce and strengthen a tire mounted thereon and to obtain maximum service from the tire.

A further object of the invention is to provide a wheel construction which distributes compressive loads on the tire over larger areas thereof than with standard wheel constructions.

The foregoing and other objects will be manifest as the specification proceeds.

Attention is directed to the accompanying drawing, in which

Figure 1 is a section through a wheel embodying the invention, which wheel has a tire and tube mounted thereon, the section being taken on line 1—1 of Figure 2;

Figure 2 is a fragmentary side elevation of the wheel and tire shown in Figure 1 with the covering disc removed; and Figure 3 is a fragmentary section, similar to Figure 1 of the tire and wheel assembly showing the tire when subjected to impact forces.

Referring in detail to the accompanying drawing, a split wheel 10 is shown, which wheel includes two disc-like annular members 11 and 12. Each of the members 11 and 12 includes a hub portion 13, a tire seating portion 14 and a tire retaining or reinforcing portion 15. Bearing means 16, of any suitable construction, are received in each of the hub portions 13 to facilitate mounting the wheel on an axle. A cylindrical reinforcing or spacing element 17 is seated on shoulders 18 formed on the inner ends of the hub portions 13 to strengthen and reinforce the assembled wheel construction.

The members 11 and 12 are secured together by bolts 19 or other suitable means that extend between abutted radially extending portions 21 of the members 11 and 12, which portions reinforce the tire seating portions 14. Frusto-conical portions 22 connect the portions 21 to the hub portions 13 and may have circular apertures 23 formed therein to reduce the weight of same. The frusto-conical portions 22 provide sturdy connections between the tire seating portions 14 and the hub portions 13 so that the wheel is adapted to carry heavy loads and high impact stresses. Of course, the wheel 10 is made from any suitable metal, such as an aluminum alloy, and is manufactured by any desired process.

The tire seating portions of the annular members 11 and 12 are substantially standard in construction and include inclined bead seats 24 and radially outwardly, or vertically extending flanges 25. A low profile pneumatic tire 26 of the type covered in British Patent 496,183 and having beads 27 is received on the wheel 10 with the beads 27 being engaged by the bead seats 24 and held on the wheel in the usual manner by vertical flanges 25. A pneumatic tube 28 is received in the tire 26 and a valve 29 extends through a hole 31 formed in the member 11.

One important feature of the present wheel construction is that substantially conical extensions 32 are formed on the ends of the flanges 25, which extensions extend radially and laterally outwardly from the tire seating portions of the wheel and form the tire retaining means for the wheel. The conical extensions 32 extend at a relatively low angle to the rim bases 24 and are of such length as to extend substantially to the lateral margins of the tire 26 when the tire is flattened against the wheel, as shown in Figure 3. The construction of the invention thereby provides tire retaining portions 15 which gradually come into contact with the side walls of the tire 26 adjacent the beads 27 as the tire is flattened, either by impact forces or as the result of deflation of the tire. Substantially laterally extending flanges 32a are provided at the margins of the extensions 32 to reenforce same and to provide flat peripheral rim portions which press the lateral margins of the tire 26 against the ground when the tire has been flattened over the rim as shown in Fig. 3.

The split wheel of the invention eliminates the sharp edges or corners on the tire retaining flanges of normal wheel constructions, which sharp edges concentrate stresses and exert a cutting action on a tire carried thereby when the tire is subjected to impacts or operated with less than normal pressure therein. Nor can the tire 26 be thrown from the wheel 10 as with usual wheel constructions. The tire is mounted on one of the annular members prior to its engagement with the other annular member and can only be removed from the wheel by separating the sections thereof.

The wheel 10 is reinforced by radially directed ribs 33 formed thereon, which ribs extend from the hub portions 13 to the tire seating portions 14 and tire retaining portions 15. The ribs also are formed integrally with the frusto-conical portions 22 whereby a sturdy construction results. The portions 34 of the annular members 11 and 12 immediately adjacent the ribs 33 in the portions 21 of the annular members may be thicker than the remaining portions of the portion 21 to provide reinforcing means for the means connecting the wheel members together. Screws 35 may be engaged with the radially outer portions of the ribs 33 in order to secure metal covering discs 36 to the wheel members. The disc adjacent the valve 29 has an inflation opening 37 therein which is covered by a pivotally mounted metal cover 38 which can be moved to open or close the opening 37.

Although the invention has been described in connection with but one embodiment thereof, it will be apparent that changes will suggest themselves to those skilled in the art without departing from the spirit of the invention which is limited, therefore, only by the prior art and the scope of the appended claims.

What is claimed is:

1. A split wheel for pneumatic airplane tires comprising a hub, a pair of frusto-conical annular strut members extending from said hub and integral therewith, and a tire seating rim extending from the periphery of said annular strut members, said rim including a base and tire bead seat portion, radially extending tire bead supporting portions, and tire side wall supporting portions extending radially and laterally outwardly from each of the bead supporting portions, said side wall supporting portions terminating in axially outwardly extending portions of substantial width, said side wall supporting portions with their said axial extensions being of sufficient width to support the entire tire side wall portions when the tire is in collapsed, flattened or deflated condition, said wheel comprising radial ribs which are an integral part of the wheel and extend from the laterally outer peripheral margins of each of the side wall supporting flanges to said hub portion, for transmitting the load from said flanges to the hub.

2. A split wheel for pneumatic tires, comprising a hub, a pair of frusto-conical annular strut members extending from said hub, and a tire seating rim extending from the periphery of said annular strut members, said rim including a base and tire bead seat portion, radially extending tire bead supporting portions, and tire side wall supporting portions integral with and extending radially and laterally outwardly from each of the bead supporting portions, said side wall supporting portions terminating in axially outwardly extending portions of substantial width, said side wall supporting portions with their said axial extensions being of sufficient width to support the entire side wall portions of the tire when the tire is in collapsed, flattened or deflated condition.

3. An airplane split wheel of the class described comprising two frusto-conical annular strut members, each of said members being frusto-conical in radial section, and being assembled in reversed position to each other with the tops of the conical portions abutting, said members being retained in operative position by bolts through said tops, said members having outwardly turned axially extending inner margins forming a wheel hub and outwardly turned radial and axially extending outer margins forming a tire support, said tire support comprising a tire rim base and tire bead seat portion, radially extending tire bead supports, tire side wall supporting portions integral with and extending radially and laterally outwardly from said radial bead supporting portion, said side wall supporting portions terminating in axially outwardly extending portions of substantial width, said side wall supporting portions with their said axial extensions being of sufficient width to support the entire tire side wall portions when said tire is in a collapsed, flattened condition, radial ribs extending from the peripheral margins of said members to their hub portions whereby a portion of the load supported by peripheral portions of said members is transmitted to said hub.

WARREN W. SHAW.